US006191550B1

United States Patent
Yoshihara

(10) Patent No.: US 6,191,550 B1
(45) Date of Patent: Feb. 20, 2001

(54) METHOD AND APPARATUS FOR DETECTING ABNORMALITY IN ROTATION SENSOR

(75) Inventor: Shigeyuki Yoshihara, Hitachinaka (JP)

(73) Assignees: Hitachi, Ltd., Tokyo; Hitachi Car Engineering Co., Ltd., Hitachinaka, both of (JP)

( * ) Notice: Under 35 U.S.C. 154(b), the term of this patent shall be extended for 0 days.

(21) Appl. No.: 09/384,225

(22) Filed: Aug. 27, 1999

(30) Foreign Application Priority Data

Aug. 27, 1998 (JP) .................................................. 10-241370

(51) Int. Cl.[7] ........................... H02K 23/00; G01D 5/245
(52) U.S. Cl. ........................ 318/661; 318/638; 318/648; 318/138; 324/163
(58) Field of Search ................................. 318/138, 139, 318/245, 254, 560–696, 439; 395/89; 324/163, 166, 160, 165; 364/565; 235/183, 186; 340/347 SY; 341/116, 112.1, 111, 113, 114

(56) References Cited

U.S. PATENT DOCUMENTS

| 4,011,440 | * | 3/1977 | Steglich ................................. 235/183 |
| 4,963,800 | * | 10/1990 | Kajiwara et al. ..................... 318/254 |
| 5,075,870 | * | 12/1991 | Kojyo et al. ............................ 395/89 |
| 5,260,650 | * | 11/1993 | Schwesig et al. ..................... 324/163 |
| 5,691,611 | * | 11/1997 | Kojima et al. ........................ 318/254 |
| 5,796,357 | * | 8/1998 | Kushihara ............................. 341/116 |

FOREIGN PATENT DOCUMENTS 9-72758 * 3/1997 (JP) .

* cited by examiner

Primary Examiner—Paul Ip
(74) Attorney, Agent, or Firm—Evenson, McKeown, Edwards & Lenahan, P.L.L.C.

(57) ABSTRACT

In a rotation sensor having a resolver attached to a rotor and a signal processing unit for angle detection for supplying a reference signal having a predetermined periodic waveform to the resolver, allowing the resolver to generate a sin signal having a waveform obtained by amplitude-modulating the reference signal by sin θ and a cos signal having a waveform obtained by amplitude-modulating the reference signal by cos θ, and detecting the angle θ on the basis of the sin signal and cos signal, there are provided a signal processing unit for rotation detection for outputting a rotation pulse signal and a reference position signal on the basis of the angle θ and a signal process abnormality detecting unit for detecting the presence or absence of an abnormality in the signal processing unit for angle detection on the basis of the angle θ and an angle θ' calculated from both of the rotation pulse signal and the reference position signal of the signal processing unit for rotation detection. When an abnormality occurs in an output of the signal processing circuit for obtaining the angle of the rotor from the output of the resolver as an angle detecting apparatus, the angle cannot be accurately detected. In order to solve the problem, an apparatus and method which can detect an abnormality in an output of the signal processing circuit are provided.

5 Claims, 8 Drawing Sheets

METHOD AND APPARATUS FOR DETECTING ABNORMALITY IN ROTATION SENSOR

BACKGROUND OF THE INVENTION

1. Field of the Invention

The present invention relates to a method and apparatus for detecting an abnormality (abnormal condition) in a rotation sensor, which detects an abnormal condition of a signal processing circuit related to a resolver. More particularly, the invention relates to a method and apparatus for detecting an abnormality in a rotation sensor, adapted to detect an abnormality in a resolver in a control circuit for driving a motor of an electric vehicle.

2. Description of Related Art

For example, at the occasion of controlling the number of rotations of a motor for driving an electric vehicle, it is necessary to accurately rotate the vector of a current supplied to the driving motor in accordance with the rotations of the driving motor. In an electric vehicle, therefore, it is necessary to accurately detect the rotor position (angle) of the driving motor of the electric vehicle. In fields, including the above kind of field, where the position of a rotor should be accurately detected, a resolver is used as means for detecting the position (angle) of the rotor.

Even if an apparatus using the resolver is employed as an angle detecting apparatus, however, when an abnormality occurs in an output of a signal processing circuit which obtains the angle of the rotor from an output of the resolver, the angle cannot be reliably accurately detected. In an apparatus disclosed in Japanese Patent Application Laid-Open No. 9-72758, an abnormality in the signal processing circuit can be detected. Since an A/D converting process is used for the abnormality detection and the angle is estimated from the result of the A/D conversion, however, the detection accuracy is low. The threshold of the abnormality detection has to be accordingly increased, so that it can be considered that the reliability of the abnormality detection deteriorates. Since the construction including the A/D converting circuit has the large number of components, the failure rate of the abnormality detecting circuit itself may be also increased.

SUMMARY OF THE INVENTION

The invention has been realized to solve the problems and its object is to provide a method and apparatus capable of detecting an abnormality in an output of a signal processing circuit by making a signal processing system redundant, moreover, adapted to a control of a driving motor of an electric vehicle or the like.

In order to achieve the object, according to the invention, in a rotation sensor comprising a resolver attached to a rotor and a signal processing unit for angle detection for supplying a reference signal having a predetermined periodic waveform to the resolver, allowing the resolver to generate a sin signal having a waveform obtained by amplitude-modulating the reference signal by sin θ when an angle of the rotor is θ and a cos signal having a waveform obtained by amplitude-modulating the reference signal by cosθ, and detecting the angle θ on the basis of the sin signal and the cos signal, there are provided a signal processing unit for rotation detection which outputs a rotation pulse signal and a reference position signal on the basis of the angle θ, and a signal process abnormality detecting unit for detecting the presence or absence of an abnormality in the signal processing unit for angle detection on the basis of the angle θ and an angle θ' calculated from both of the rotation pulse signal and the reference position signal of the signal processing unit for rotation detection.

According to the invention, the angle signal processing unit detects the angle θ on the basis of the sin signal and the cos signal. The rotation signal processing unit outputs the rotation signal pulse and the reference position signal pulse on the basis of the angle θ. When a significant difference occurs between the angle θ detected by the signal processing unit for angle detection and the angle θ' calculated on the basis of signals from the signal processing unit for rotation detection, the abnormality detecting unit can regard that an abnormality occurs in an output of the signal processing circuit. In the invention, since the difference between detection results of the signal processing units is used, an abnormality in the signal processing unit for angle detection or the signal processing unit for rotation detection can be accurately detected. Since the apparatus can be constructed by a simple digital circuit without using an A/D converting circuit, the number of components is small and the reliability can be enhanced.

According to another feature of the invention, in a rotation sensor abnormality detecting apparatus comprising a resolver for generating a signal in accordance with the angle of a rotor, an R/D converter for outputting a rotation signal and an electrical angle signal θ on the basis of an output signal of the resolver, and a detecting unit for detecting an abnormality in an output of the R/D converter, an output signal of the resolver is connected to first and second R/D converters in parallel, a rotation signal N of the first R/D converter and an electrical angle signal θ of the second R/D converter are connected to the detecting means, and the presence or absence of an abnormality in the resolver is detected from the relation between the rotation signal N of the first R/D converter and the electrical angle signal θ of the second R/D converter.

According to further another feature of the invention, with respect to the two R/D converters, a rotation signal N1 of the first R/D converter and an electrical angle signal θ2 of the second R/D converter with respect to two R/D converters are used. Even when an R/D converter is failed, the rotation signal N and the angle signal θ are synchronized, and an abnormal signal is generated, an abnormal condition can be therefore detected. Since comparison can be made by using digital data without performing A/D conversion, there are advantages that the decision level can be made low and an abnormal condition can be certainly detected.

DESCRIPTION OF THE PREFERRED EMBODIMENTS

Embodiments of the invention will be described hereinbelow with reference to the drawings.

Figure 1:
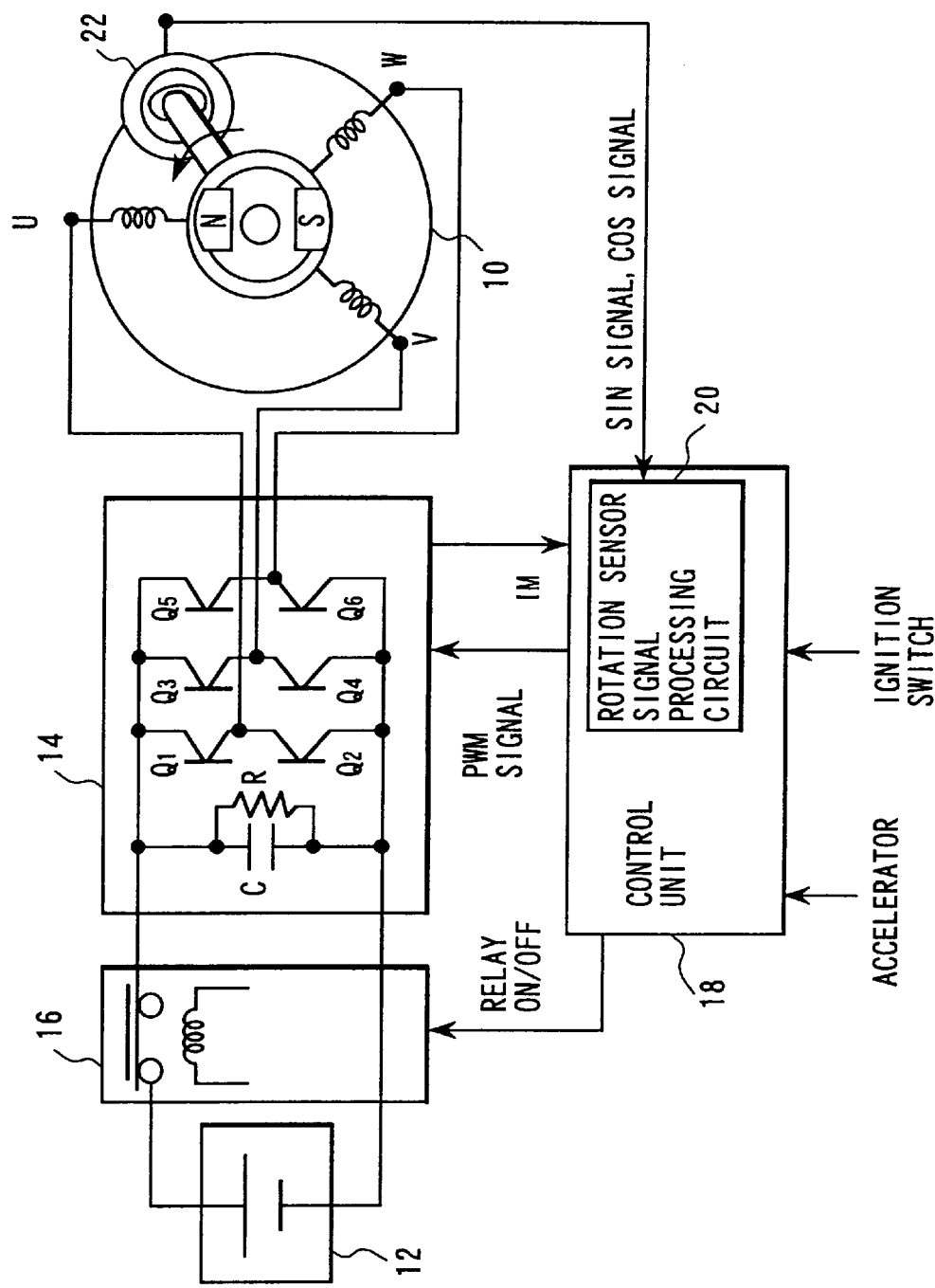
FIG. 1 is a block diagram showing a system configuration of an electric vehicle according to an embodiment of the invention.

FIG. 1 shows the system configuration of an electric vehicle according to an embodiment of the invention. In the system of the diagram, a three-phase alternating current PM motor, that is, a three-phase alternating current sync motor excited by a permanent magnet is used as a motor 10 for driving the vehicle. A battery 12 is provided as a driving power source of the motor 10. A discharge output of the battery 12 is converted into a three-phase alternating current by an inverter 14 and the three-phase alternating current is supplied to the motor 10. A power converting operation by the inverter 14 and an operation of switching a relay unit 16 provided between the battery 12 and the inverter 14 are controlled by a control unit 18. The control unit 18 switches the relay unit 16 in accordance with the operation of an ignition switch. While receiving an acceleration signal indicative of a stroke of the accelerator pedal by the driver of the vehicle, a brake signal indicative of a stroke of the brake pedal, a shift position signal indicative of a shift position, and the like, the control unit 18 receives a sin signal and a cos signal from a resolver 22 attached to the motor 10 via a rotation sensor signal processing circuit 20 and generates a current instruction to the motor 10 by using the sin and cos signals.

The control unit 18 generates a switching signal such as a PWM (pulse width modulation) signal for switching switching elements Q1 to Q6 constructing the inverter 14, on the basis of the generated current instruction and a detection value of the current of the motor 10 fed back from the inverter 14, and supplies the signal to the inverter 14. The control unit 18 also monitors a voltage applied to the inverter 14. The inverter 14 includes a capacitor C for smoothing an input from the battery 12 and a discharging resistor R of the capacitor C.

Figure 2:
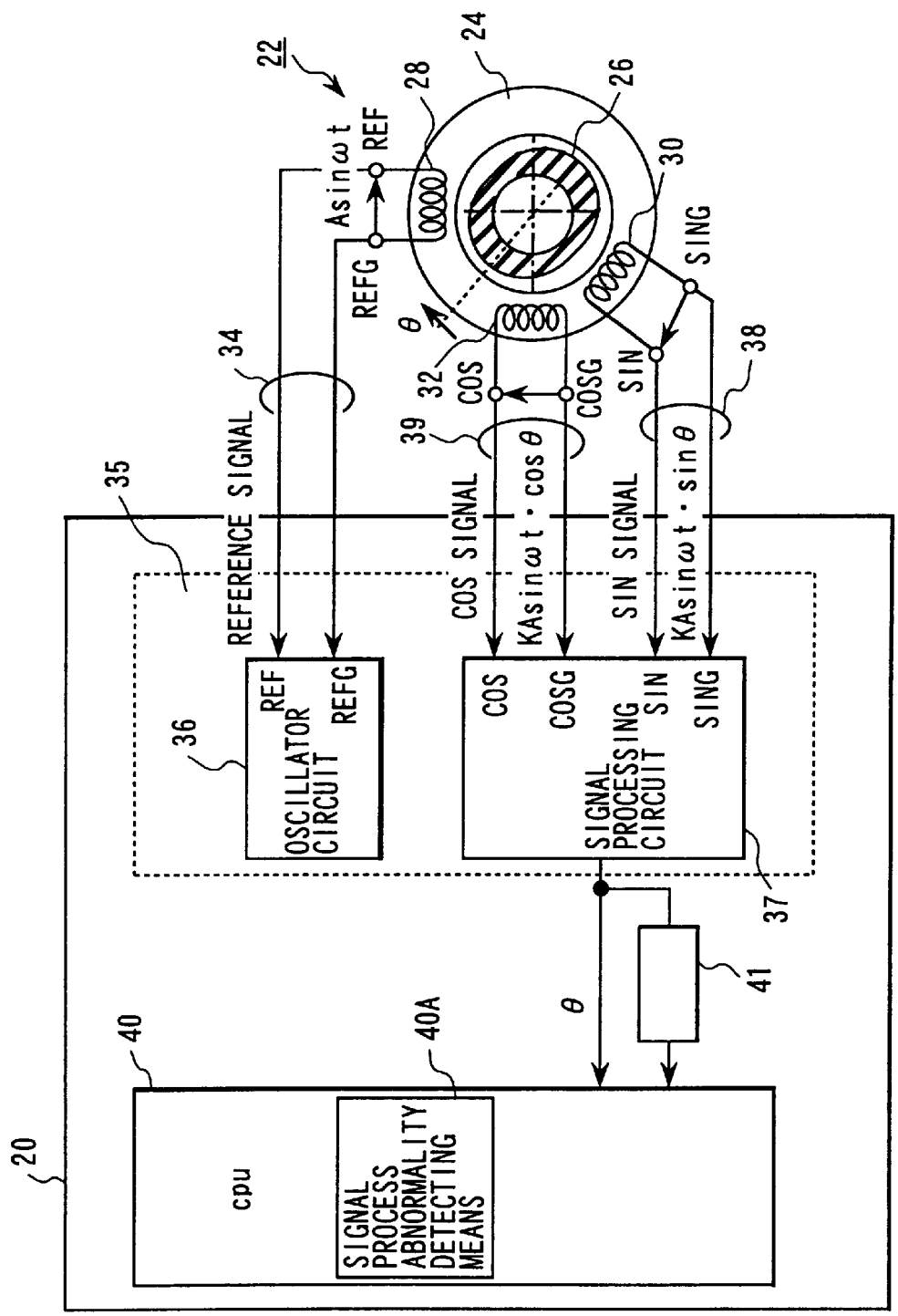
FIG. 2 is a diagram showing the construction of a resolver and an abnormality detecting means in the embodiment of FIG. 1.

More specifically, the resolver 22 and the rotation sensor signal processing circuit 20 have the hardware construction as shown in FIG. 2. The resolver 22 has a fixed part 24 fixed to the stator of the motor 10 or the vehicle and a rotary part 26 fixed to the rotor shaft. The fixed part 24 has an excitation winding 28, a sin winding 30, and a cost winding 32. The excitation winding 28 is connected between terminals REF and REFG of an R/D converter (oscillator circuit) 36 in a signal processing circuit 35 via a wiring 34 and receives a reference signal having a predetermined periodic waveform from the oscillator circuit 36.

Figure 3:
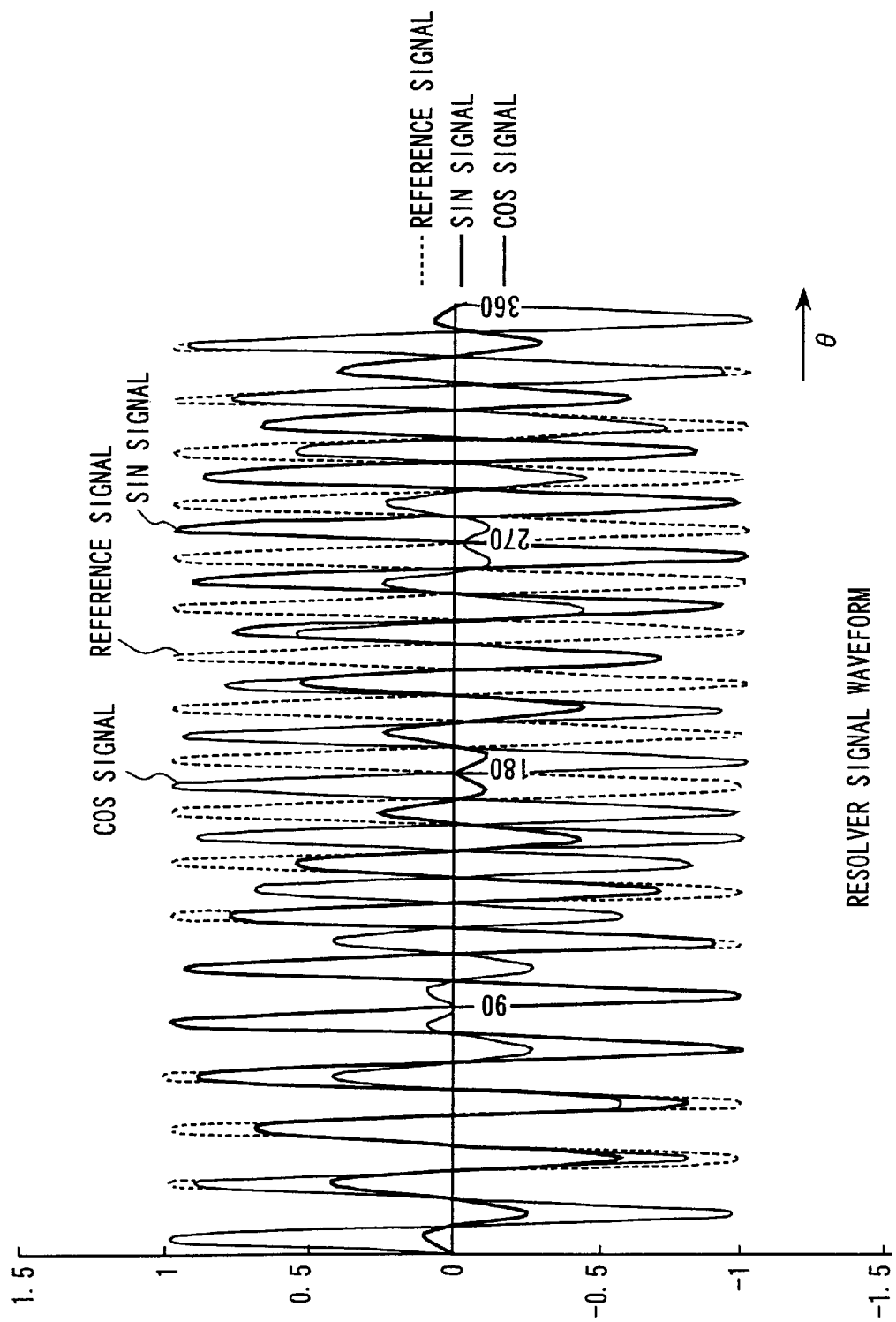
FIG. 3 is a time chart showing waveforms of input and output signals of the resolver.
Figure 4:
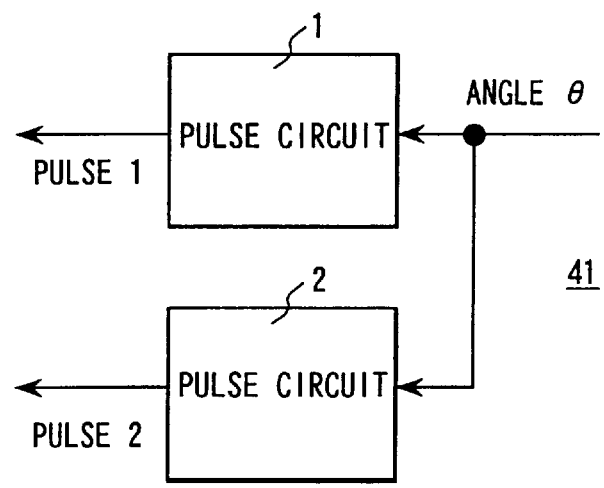
FIG. 4 is a block diagram of a rotation detection processing means in the embodiment of FIG. 1 and a diagram for explaining the operation of the means.
Figure 4:
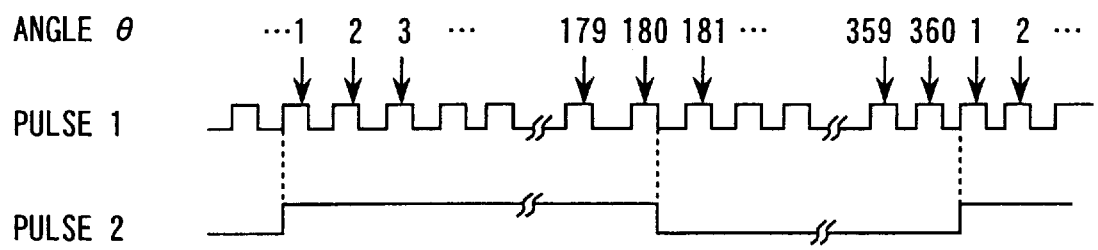

The waveform of the reference signal is, for example, a sine wave=$A \cdot \sin \omega t$ (where, A: amplitude, $\omega$: angular frequency, t: time) as shown by broken lines in FIG. 3. The sin winding 30 is connected between terminals SIN and SING of an R/D converter 37 via a wiring 38 and supplies a sin signal to the R/D converter 37. The cos winding 32 is connected between terminals COS and COSG of the R/D converter 37 via a wiring 39 and supplies a cos signal to the R/D converter 37. Each of the sin and cos signals has the waveform obtained by amplitude-modulating the reference signal in accordance with the rotary part 26 of the resolver 22 and moreover the angle $\theta$ of the rotor.

When the reference signal is, for instance, the sin wave= $A \cdot \sin \omega t$, the sin winding 30 and the cos winding 32 are arranged so that the sin signal expressed as $K \cdot A \cdot \sin \omega t \cdot \sin \theta$ and the cos signal expressed as $K \cdot A \cdot \sin \omega t \cdot \cos \theta$ are obtained as shown in FIG. 3 (where, K is an amplitude coefficient). The R/D converter 37 detects the position of the rotary part 26 of the resolver 22, that is, the angle $\theta$ of the rotor on the basis of the sin and cos signals.

A rotation detection signal processing circuit 41 has a pulse circuit 1 for outputting a pulse each time the angle $\theta$ changes by one degree on the basis of the angle $\theta$ obtained from the R/D converter 37 and a pulse circuit 2 for outputting a pulse which goes high when the angle $\theta$ is in a range from 0 to 180 degrees and goes low when the angle $\theta$ is larger than 180 degrees and smaller than 360 degrees.

Figure 5:
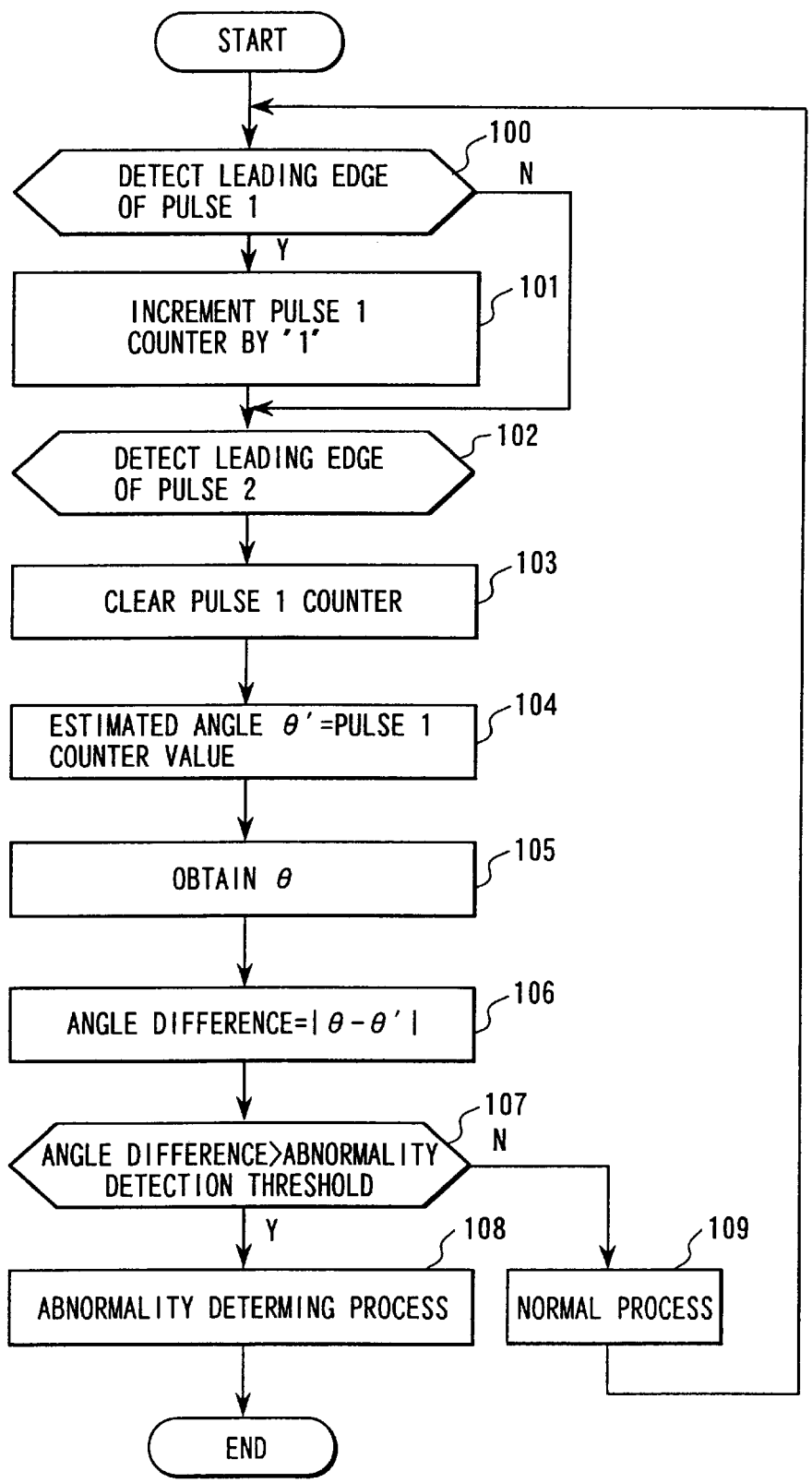
FIG. 5 is a flowchart of angle calculating and abnormality detecting processes of a control CPU in the embodiment of FIG. 1.

A signal process abnormality detecting means 40A in a control CPU 40 obtains the angle $\theta$, calculates an angle estimated value $\theta'$ from the pulses 1 and 2, and detects an abnormal condition by using $\theta$ and $\theta'$. The operations are shown in the flowchart of FIG. 5. In step 100, detection of the leading edge of the pulse 1 is executed. When the leading edge of the pulse 1 is detected, a pulse 1 counter is incremented by "1". In step 102, detection of the leading edge of the pulse 2 is performed. When the leading edge of the pulse 2 is detected, the pulse 1 counter is cleared in step 103. In step 104, the value of the pulse 1 counter is stored as an estimated angle $\theta'$. In step 105, the angle $\theta$ is obtained. In step 106, the absolute value of an angle difference ($\theta - \theta'$) between the angle $\theta$ and the estimated angle $\theta'$ is calculated. In step 107, when the angle difference is larger than an abnormality detection threshold, an abnormality determining process in step 108 is executed. If not, a normal process in step 109 is executed.

Figure 6:
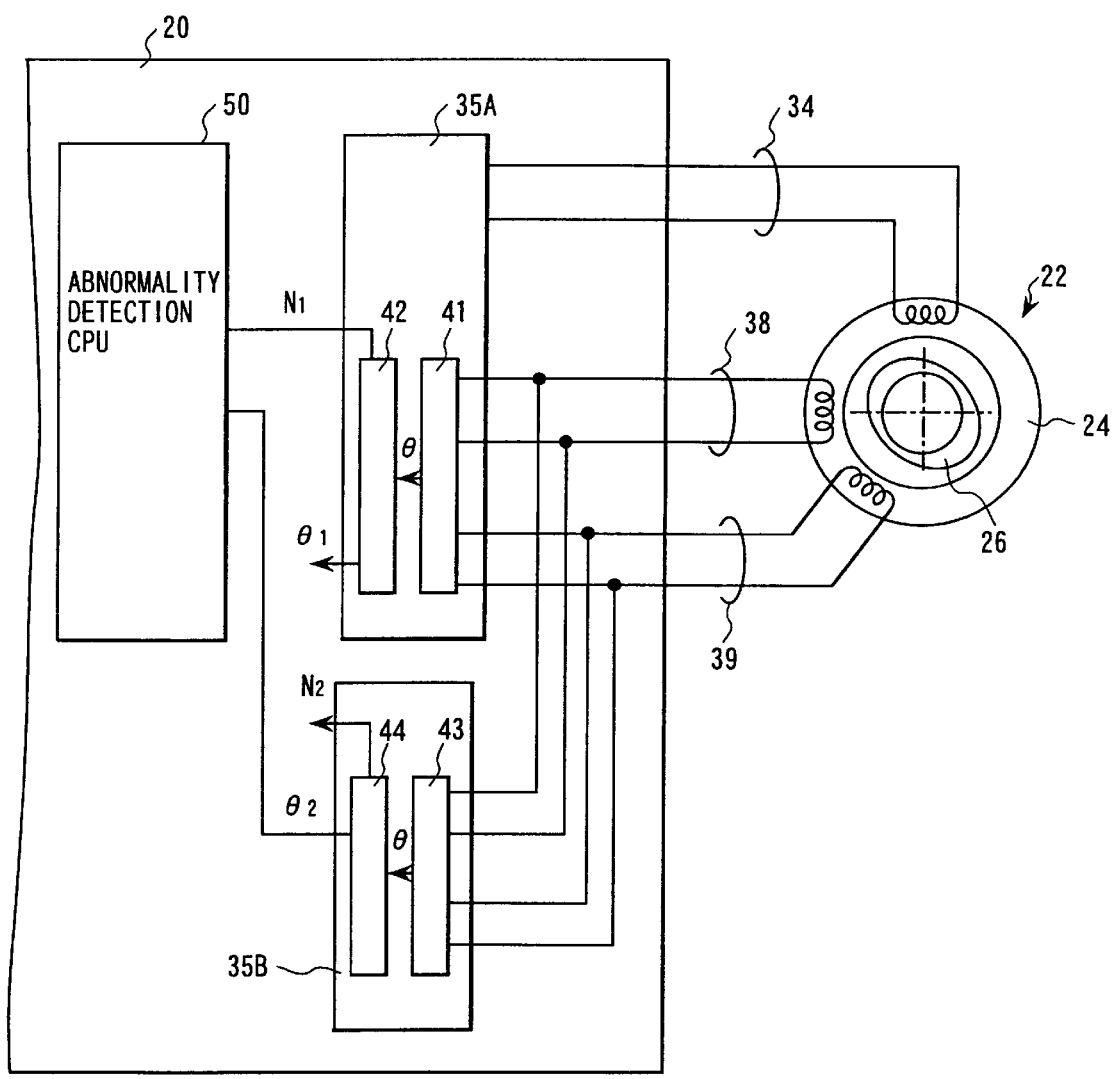
FIG. 6 is a diagram showing the construction of a resolver and an abnormality detecting means according to another embodiment of the invention.

Another embodiment of the invention will now be described with reference to FIGS. 6 to 8. The resolver 22 and the rotation sensor circuit 20 have the circuit construction shown in FIG. 6. The construction of the resolver 22 is the same as that shown in FIG. 2. An exciting signal 34 of a first R/D converter 35A is connected to the resolver 22. A sin signal 38 and a cos signal 39 according to the number of rotations of the rotary part 26 are supplied to the R/D converter 35A and the angle $\theta$ is obtained by the signal processing circuit 41. The angle $\theta$ is inputted to an encoder circuit 42 and processed, thereby obtaining a rotation signal output N1 and an angle signal $\theta 1$.

Figure 7:
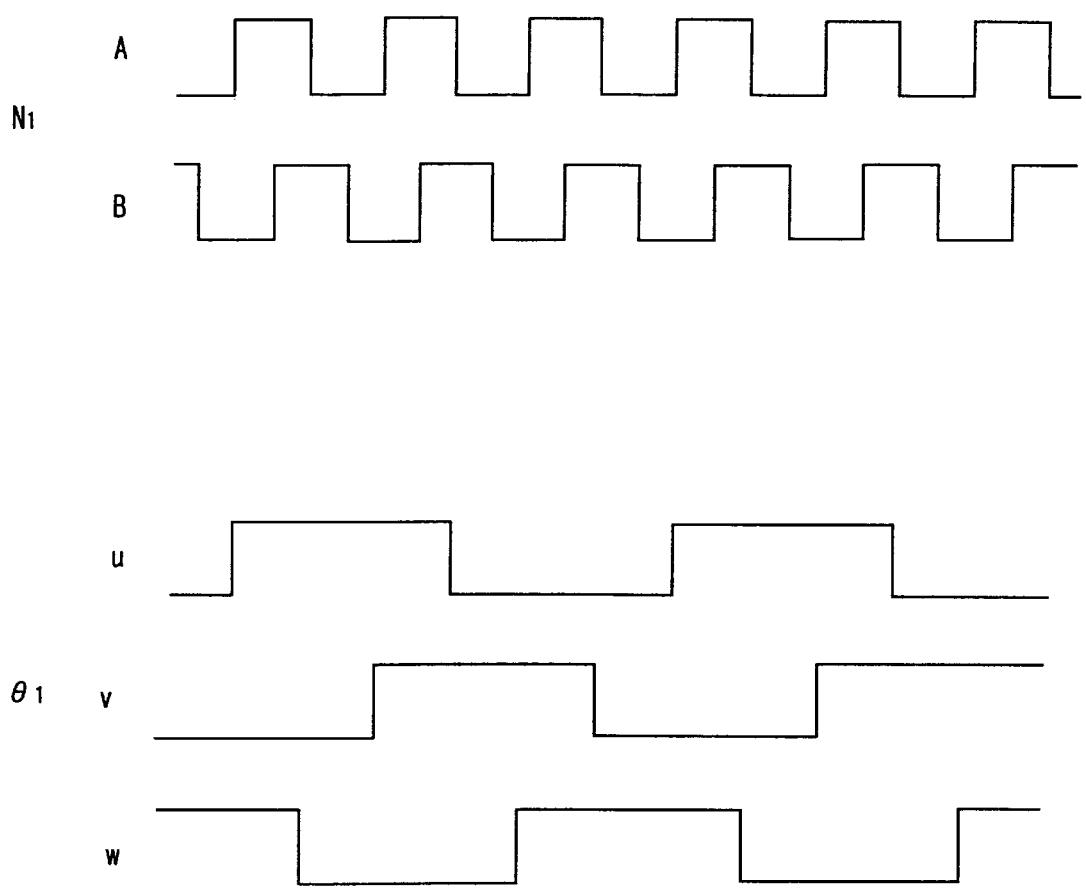
FIG. 7 is a diagram for explaining the operation of an R/D converter in the embodiment of FIG. 6.

The signals are those as shown in FIG. 7. The rotation signal output N1 is comprised of A and B signals and by which the number of rotations of the motor can be detected. The signals in the diagram are those at the time of forward rotation. At the time of reverse rotation, phases of the A and B signals are deviated from each other by 90 degrees. By predetermining the number of pulses outputted per rotation of the motor, the number of rotations of the motor can be known. On the other hand, the angle signal $\theta 1$ is a signal by which a magnetic pole position of the motor comprised of signals having phases U, V, and W can be detected.

Referring again to FIG. 6. The sin signal 38 and the cos signal 39 according to the number of rotations of the rotary part 26 are also supplied to a second R/D converter 35B and are processed by a signal processing circuit 43 and an encoder circuit 44 in a manner similar to the processes executed by the first R/D converter 35A, and a rotation signal N2 and an angle signal $\theta 2$ are outputted.

When the R/D converters 35A and 35B are normal, the rotation signals Ni and N2 are supposed to be the same and the angle signals $\theta 1$ and $\theta 2$ are similarly supposed to be the same.

An abnormality detection CPU 50 detects an abnormal condition of the resolver 22 on the basis of the rotation signals N and the angle signals θ. Specifically, when the period obtained on the basis of the rotation signals N is Ta, the period obtained on the basis of the angle signals θ is Tu, and both of the R/D converters are normal, the following relation is satisfied.

Tu=K×Ta (where K is a constant)

By using the relation, an abnormal condition of the resolver 22 is detected.

Figure 8:
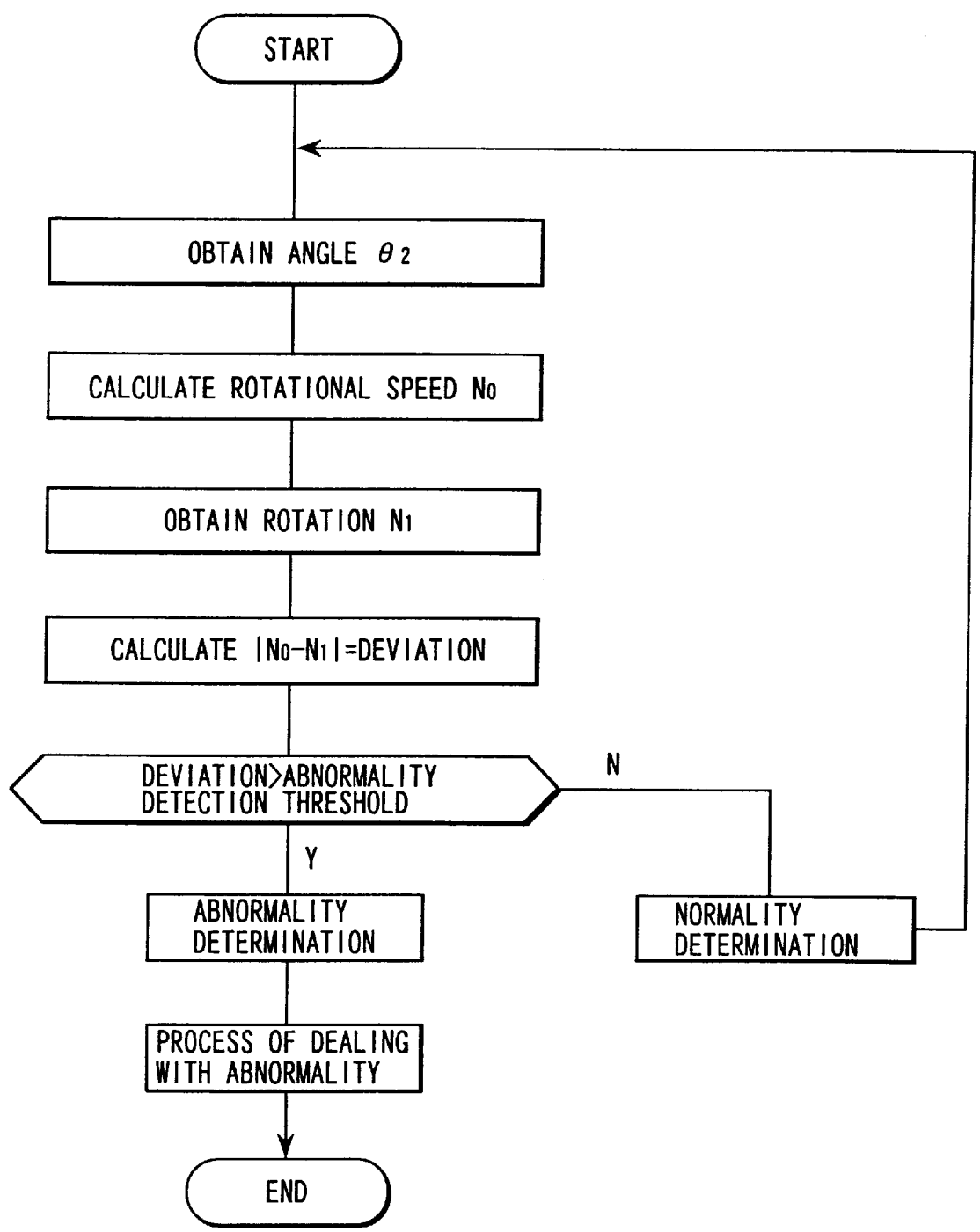
FIG. 8 is a flowchart of the operation of an abnormality detecting CPU in the embodiment of FIG. 6.

The abnormality detection CPU 50 executes the operation shown in FIG. 8 every predetermined period of T seconds. First, the electrical angle signal θ2 of the second R/D converter 35B is obtained and the present number of rotations N0 is calculated from the period T. The rotation signal N1 of the first R/D converter 35A is then obtained, and the absolute value |N0–N1| of the difference between N1 and N0 is calculated and used as a deviation. Whether the deviation is larger than the predetermined abnormality detection threshold or not is determined. When the deviation is larger than the threshold, a predetermined process to deal with the abnormality is executed.

As mentioned above, as the rotation signal and the electrical angle signal to be connected to detecting means (abnormality detection CPU 50), the rotation signal N1 of the first R/D converter and the electrical angle signal θ2 of the second R/D converter with respect to the two R/D converters are used. Consequently, the invention is characterized in that, even when an R/D converter becomes faulty, the rotation signal N and the angle signal θ are synchronized and an abnormal signal is generated, an abnormality can be detected. Since comparison can be performed by using digital data without performing A/D conversion, there are advantages that the decision level can be made low and an abnormality can be certainly detected.

As described above, according to the invention, the angle θ obtained from the rotation signal processing circuit is compared with the angle θ obtained from the angle detecting means and whether or not there is a difference by which it can be regarded that an abnormality occurs is detected. An abnormality can be thus certainly detected.

According to another feature of the invention, since the rotation signal of the first R/D converter and the electrical angle signal of the second R/D converter with respect to the two R/D converters are used, even when an R/D converter is failed, the rotation signal and the angle signal are synchronized, and an abnormal signal is generated, an abnormality can be detected. Since the comparison can be carried out by using digital data without performing A/D conversion, there are advantages that the decision level can be made low and an abnormality can be certainly detected.

What is claimed is:

1. An apparatus for detecting an abnormality in a resolver attached to a rotor, comprising:
    a unit for supplying a reference signal having a predetermined periodic waveform to the resolver;
    a unit for allowing the resolver to generate a sin signal having a waveform obtained by amplitude-modulating the reference signal by sin θ when an angle of the rotor is θ and a cos signal having a waveform obtained by amplitude-modulating the reference signal by cos θ;
    a signal processing unit for angle detection for detecting the angle θ on the basis of the sin signal and the cos signal;
    a signal processing unit for rotation detection for outputting a rotation pulse signal and a reference position signal on the basis of the angle θ; and
    a signal process abnormality detecting unit for detecting the presence or absence of an abnormality in the signal processing unit for angle detection on the basis of the angle θ and an angle θ' calculated from both of the rotation pulse signal and the reference position signal of the signal processing unit for rotation detection.

2. An apparatus for detecting an abnormality in a resolver according to claim 1, wherein the signal processing unit for rotation detection comprises a first pulse circuit for generating a pulse each time the angle θ changes by one degree on the basis of the angle θ obtained from the signal processing unit for angle detection, and a second pulse circuit for generating a pulse which goes high when the angle θ is in a range from 0 to 180 degrees and which goes low when the angle θ is larger than 180 degrees and is smaller than 360 degrees, and
    the signal process abnormality detecting unit calculates an angle estimated value θ' by using outputs of the first and second pulse circuits and detects an abnormality by comparing the angle θ with the angle estimated value θ'.

3. An apparatus for detecting an abnormality in a resolver which generates a signal in accordance with an angle of a rotor, comprising:
    a first R/D converter for outputting a rotation signal on the basis of an output signal of the resolver;
    a second R/D converter which is connected to the first R/D converter in parallel and outputs an electrical angle signal on the basis of an output signal of the resolver; and
    a unit for diagnosing whether there is an abnormality in the resolver or not from the relation between the rotation signal of the first R/D converter and the electrical angle signal of the second R/D converter.

4. An apparatus for detecting an abnormality in a resolver according to claim 1
    wherein the resolver has a fixed part fixed to a driving motor of an electric vehicle and a rotary part fixed to the shaft of the rotor and
    generates a current instruction to the motor on the basis of an output signal of the resolver.

5. A method of detecting an abnormality in a resolver which generates a signal in accordance with an angle of a rotor, comprising the steps of:
    supplying a reference signal having a predetermined periodic waveform to a resolver attached to a rotor;
    allowing the resolver to generate a sin signal having a waveform obtained by amplitude-modulating the reference signal by sin θ and a cos signal having a waveform obtained by amplitude-modulating the reference signal by cos θ when the angle of the rotor is θ;
    detecting the angle θ on the basis of the sin signal and the cos signal;
    outputting a rotation pulse signal and a reference position signal on the basis of the angle θ; and
    detecting the presence or absence of an abnormality in the signal processing unit for angle detection on the basis of the angle θ detected by the signal processing unit for angle detection and the angle θ' calculated from the rotation pulse signal and the reference position signal of the signal processing unit for angle detection.

* * * * *